United States Patent [19]
Hrovat et al.

[11] Patent Number: 4,792,902
[45] Date of Patent: Dec. 20, 1988

[54] ENGINE IGNITION TIMING FOR A CLUTCH ENGAGEMENT CONTROL SYSTEM

[75] Inventors: Davorin Hrovat; Charles Heermann, both of Dearborn; William E. Tobler, Willis, all of Mich.

[73] Assignee: Ford Motor Company, Dearborn, Mich.

[21] Appl. No.: 808,186

[22] Filed: Dec. 12, 1985

[51] Int. Cl.$^4$ .............. B60K 41/02; F02P 5/145; F16D 43/286
[52] U.S. Cl. .................. 364/424.1; 74/851; 123/419; 192/0.052; 192/3.28
[58] Field of Search .............. 364/424.1; 74/851, 860, 74/866; 123/419, 422; 192/0.052, 0.092, 3.28

[56] References Cited

U.S. PATENT DOCUMENTS

| | | | |
|---|---|---|---|
| 4,246,805 | 1/1981 | Umezawa | 74/851 |
| 4,357,662 | 11/1982 | Schira et al. | 123/419 |
| 4,370,903 | 2/1983 | Stroh et al. | 74/851 |
| 4,389,992 | 6/1983 | Shigematsu et al. | 123/419 |
| 4,403,527 | 9/1983 | Mohl et al. | 74/851 |
| 4,453,521 | 6/1984 | Takasu et al. | 123/419 |
| 4,503,734 | 3/1985 | Acker | 74/866 |
| 4,505,368 | 3/1985 | Ackermann | 192/0.092 |
| 4,514,811 | 4/1985 | Daubenmier | 364/424.1 |
| 4,527,678 | 7/1985 | Pierce et al. | 192/3.58 |
| 4,620,420 | 11/1986 | Gloss et al. | 74/860 |

FOREIGN PATENT DOCUMENTS

| | | | |
|---|---|---|---|
| 0048738 | 3/1983 | Japan | 123/419 |
| 0175655 | 10/1984 | Japan | 74/860 |
| 0142058 | 7/1985 | Japan | 123/419 |

OTHER PUBLICATIONS

"Ratio Changing the Passenger Car Automatic Transmission," F. Winchell & W. Route, Chapt. 10 Jun. 84.
"Electronic Control of a 4-Speed Automatic Transmission with Lock-Up Clutch," SAE Technical Paper Series 840448, Feb. 1984.

*Primary Examiner*—Felix D. Gruber
*Attorney, Agent, or Firm*—Frank G. McKenzie; Donald J. Harrington

[57] ABSTRACT

A system and method for controlling the ignition timing of a spark ignition internal combustion engine in a driveline that includes a multiple speed ratio transmission, at least one of whose operating speed ratios depends on the engaged or disengaged state of a clutch, the rotating inertia of the engine, equivalent vehicle inertia, a spring associated with the stiffness of the axle, inherent structural damping, and a spark advance controller-filter, whose output advances and retards the spark timing of the engine in accordance with the magnitude of engine speed and transmission output speed according to a control algorithm, which improves speed ratio control during shifts and minimizes the underdamped oscillations that result after the clutch is fully engaged.

4 Claims, 3 Drawing Sheets

ENGINE IGNITION TIMING FOR A CLUTCH ENGAGEMENT CONTROL SYSTEM

BACKGROUND OF THE INVENTION

Field of the Invention

This invention relates to a control for clutch engagement and transmission gear ratio changing. More particularly, it pertains to electronically controlled, hydraulically actuated clutch engagement in a power train that includes a multiple speed ratio transmission or a continuously variable speed ratio transmission and a spark ignition internal combustion engine.

SUMMARY OF THE INVENTION

Objectionable transmission output torque transient vibrations are often produced during a gear ratio change from a previous ratio to a new ratio after a clutch is engaged to produce the new gear ratio and a clutch is disengaged to release the previous gear ratio. The vibrations in the driveline that result from the gear ratio change are in the range from 2 to 10 Hz. Experience has demonstrated that this objectionable vibration can be prevented or reduced if the principal inertial masses, reflected engine inertia, gearset inertia and vehicle inertia, are interconnected with a damping effect that exceeds the relatively small amount of damping that is inherent in the driveline and by the elastic effect of the driveline components that store mechanical energy.

One of the objectives of this invention is to reduce the transient vibrations in a driveline during upshifts after the oncoming clutch becomes fully engaged. This object is realized by increasing the damping in the powertrain after the clutch is locked up by including a closed feedback loop in the system that controls transmission and engine operation. The feedback strategy employs filtered engine speed and filtered transmission output speed as a basis for advancing or retarding the ignition spark with respect to a reference to increase the damping. The spark timing is altered as a function of the inertia torque.

The ignition spark control is enabled and retarded after the actual speed ratio of the transmission crosses below the synchronous speed ratio of the gear ratio from which an upshift is being made. Engine torque is reduced when the spark is retarded with respect to the reference.

This object is realized by a control according to this invention for advancing and retarding the spark of an internal combustion engine driveably connected to a multiple speed ratio automatic or manual transmission, through which the driveshafts and wheels of a vehicle are driven from the engine. The gear ratio of the transmission can be selected for engagement either manually by the vehicle operator, automatically by the control system of the transmission or both manually and automatically. The engine speed and transmission output speed are used to produce signals which represent these respective speeds. The engine is equipped with a distributor or another device for developing a high voltage ignition pulse between the electrodes of spark plugs located in each of the engine cylinders. The occurrence of the high voltage is made with reference to the position of the engine piston that reciprocates within the cylinder and with reference to the open and closed position of intake and exhaust valves, which admit a combustible mixture of the cylinders and permit exhaust gases to leave the engine.

A controller is programmed to calculate a signal used to advance and to retard the high voltage pulse on the basis of the value of a variable whose magnitude is calculated repetitively from the engine speed, transmission output speed, the time rate of change of the commanded or selected speed ratio of the transmission, reflected rotational inertia of the engine, command gain, derivative gain, and proportional gain of the system. An error feedback signal representing the difference between the commanded or selected speed ratio and the actual engine speed is used by the controller to determine the output signal that is used to control the timing of the engine ignition pulse.

DESCRIPTION OF THE PREFERRED EMBODIMENT

Figure 1:
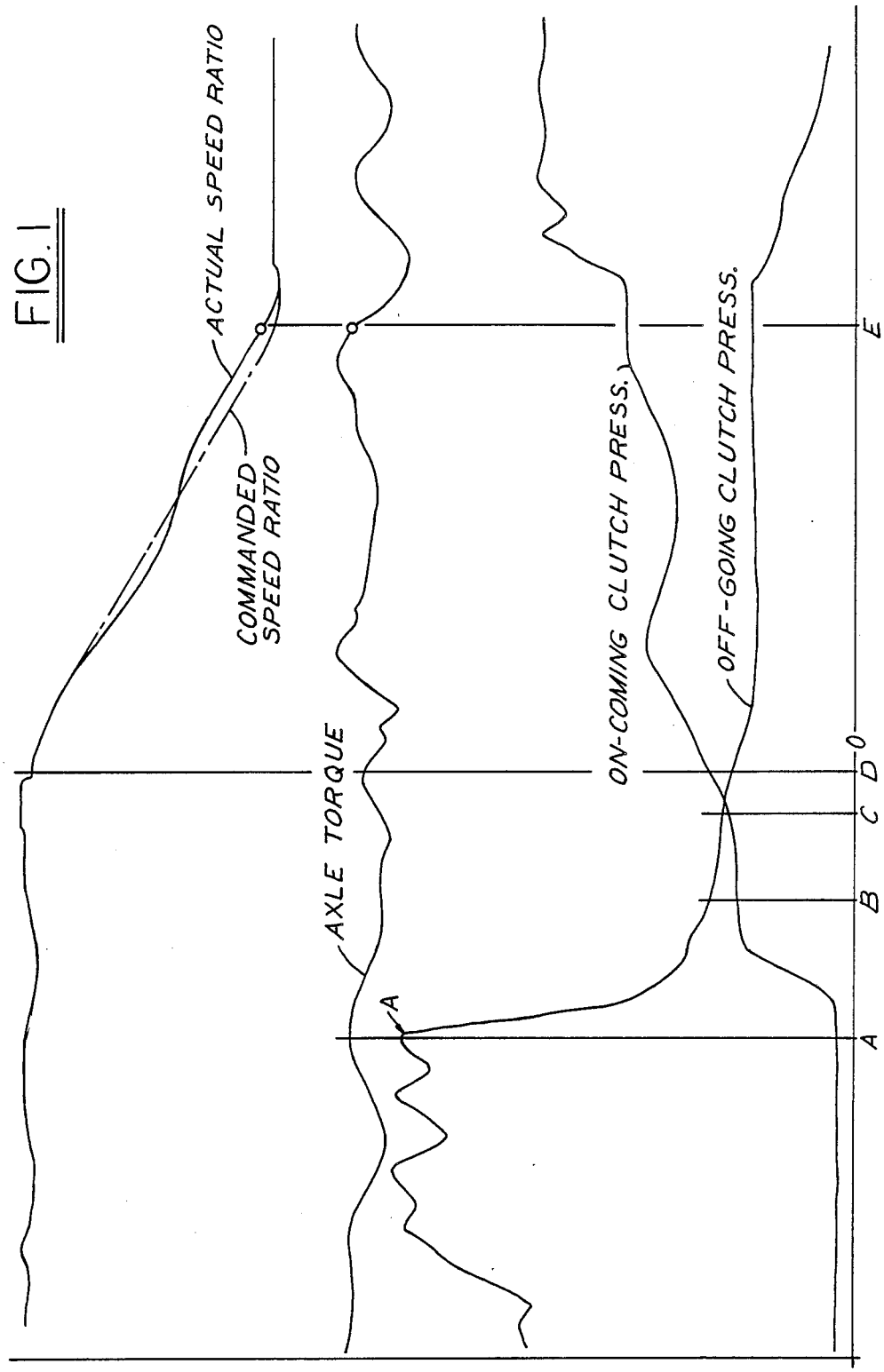
FIG. 1 are graphs showing the variation with time of the actual and commanded speed ratios, axle torque and pressure in the oncoming and offgoing clutches of the transmission.

The process of making a gear ratio change in an automotive transmission, in which at least one friction element is actuated to produce each gear ratio, is described first with reference to FIG. 1. There, with reference to an automatic power transmission, an upshift is illustrated and is described below between the first gear ratio, whose associated friction element is depressurized or offgoing, and the second gear ratio, whose associated friction element is pressurized or oncoming. The ratio of the speed of the engine to the speed of the transmission output shaft is the speed ratio. The commanded speed ratio is the ratio of the speeds of these components during an upshift. Throughout the upshift, the road speed of the vehicle is maintained constant. The friction elements whose engagement and disengagement determine the actual operating speed ratio, may be friction clutches, brakes, one-way overrunning clutches or comparable devices. In making the upshift, the capacity to carry torque is transferred from the offgoing clutch to the oncoming clutch as the hydraulic pressure within the clutch cylinders falls and rises, respectively.

An upshift begins, after a change of speed ratio is commanded, either manually by control of the vehicle operator over the gear selector or automatically according to a shift schedule stored within the control system of the transmission. First, hydraulic pressure in the offgoing clutch cylinder begins to decrease as indicated at point A. Initially the pressure decrease merely permits the excess torque capacity of the clutch, the capacity of the clutch to transmit torque greater than the required torque capacity, to decrease. There is substantially no change in the rotational speed of the driveline as indicated by the upper line of FIG. 1.

At point B, when the pressure in the cylinder of the offgoing clutch has declined substantially, the offgoing clutch begins to slip and to allow the engine speed to rise slightly. Meanwhile, as the hydraulic pressure in the offgoing clutch continues to decrease, pressurized hydraulic fluid is directed to the oncoming friction element. When the pressure of the oncoming clutch increases initially, as shown in FIG. 1 between A and B, the oncoming clutch piston merely strokes against the return springs, but the oncoming clutch has no torque carrying capacity until its hydraulic pressure increases to the level indicated at D. Thereafter, the oncoming clutch carries torque and gradually assumes at least a portion of the torque formerly carried by the offgoing clutch. As pressure in the offgoing clutch cylinder decreases further past the level indicated at D, pressure rises in the oncoming clutch cylinder to the level at E, where torque is lifted completely from the offgoing clutch and is carried entirely by the oncoming clutch.

Beyond D, as the oncoming clutch pressure rises, differences occur between the commanded speed ratio and the actual speed ratio at which the transmission is operating, as represented by the uppermost lines of FIG. 1. Because the vehicle speed is maintained constant throughout the shift, engine speed declines as the speed ratio decreases until the shift is completed at E.

Thereafter, clutch-induced transients often occur in transmissions, particularly those that have no torque converter. The axle torque curve shown in the middle graph of FIG. 1 shows the axle torque having the characteristics of a low or partially damped transient vibration. The ability to advance and retard the timing of the high voltage ignition pulse that produces the spark in an internal combustion engine and the capacity to control the engagement and disengagement of the clutches of the transmission is used in the control according to this invention to reduce the undesirable effects of shift transients and powertrain oscillations caused by clutch lockup. During the inertia phase of the upshift, the input and reaction elements of the transmission are decelerated. Following the inertia phase of the shift abrupt engagement of the clutch can cause powertrain oscillations in a drive system unless preventive measures are taken. The control system of this invention employs engine spark timing retardation to simulate the effect of mechanical damping, thereby shortening the transient period and reducing the amplitude of the vibrations that may result.

Figure 2:
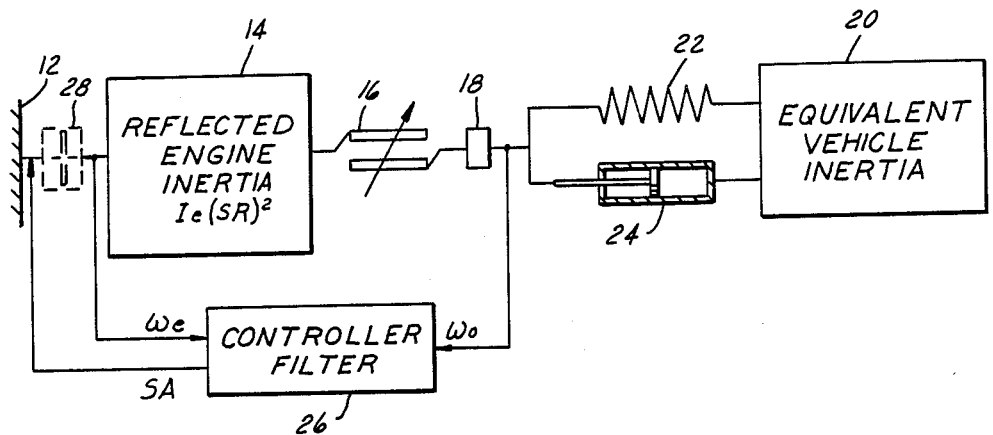
FIG. 2 is a schematic representation of the automotive driveline whose operation is controlled by the system according to this invention.

The components of a driveline with which this invention may be used are illustrated in FIG. 2, which shows also a controller filter according to this invention for controlling engine spark timing to reduce driveline vibrations. The driveline is represented principally by three masses arranged in a series connection, which vibrate with respect to a fixed plane 12. Reflected engine inertia 14, $I_e(SR)^2$, is connected through a clutch 16 or another releasable friction component to a comparatively small gear set inertia 18. A mass 20, representing vehicle inertia, is located in series with the gearset inertia through a parallel arrangement of an elastic spring 22, which represents the stiffness of the vehicle axle, and a damper 24, which represents damping inherent in the driveline. The speed of the transmission output, $\omega_o$, is sampled periodically or is filtered continuously and supplied as input to the engine spark timing controller 26. Engine speed, $\omega_e$, is sampled, filtered and supplied as input to the controller. The output SA, from the controller selectively advances and retards the ignition timing of the internal combustion engine used in combination with the driveline. The effect of the engine spark controller output is equivalent to the effect of another damper 28 connected in series between the support 12 and the reflected inertia 14.

Figure 3:
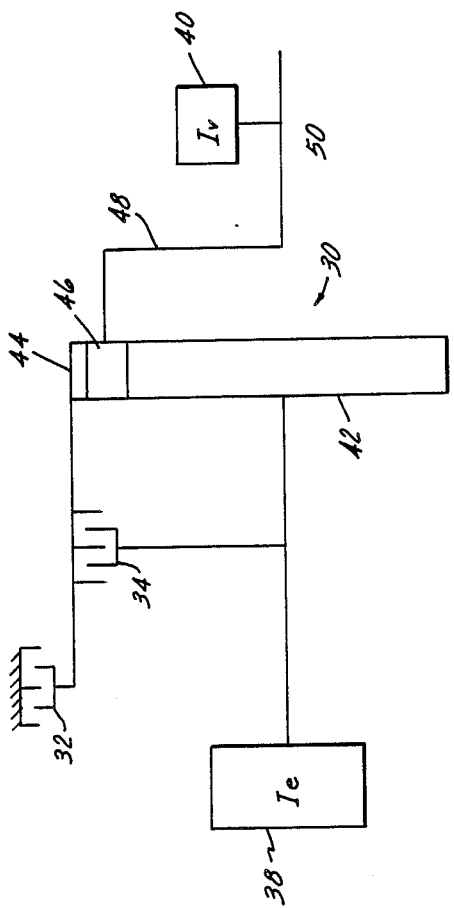
FIG. 3 is a schematic diagram of a gearset and the clutches that control its operation.

FIG. 3 shows an example of a planetary gearset 30, a one-way clutch 32, a releasable friction clutch 34 and various polar moments of inertia associated, respectively, with the engine, $I_e$ 38, and the driveline, $I_v$ 40. The gearset includes a sun gear 42, a ring gear 44, and a set of planetary pinions 46, rotatably mounted on a carrier 48 and continously engaged with the sun gear and ring gear. The reaction element is held to ground through clutch 32, and the synchronizing element is friction clutch 34, located between the engine and the reaction.

When clutch 34 is disengaged and clutch 32 is engaged, the geartrain operates in the low speed ratio and the output torque is equal to the sum of the input torque and the reaction torque. When clutch 34 is engaged, the transmission produces a direct drive connection between the engine and the output shaft 50; therefore, the reaction torque is zero and the output torque is equal to the input torque.

Figure 4:
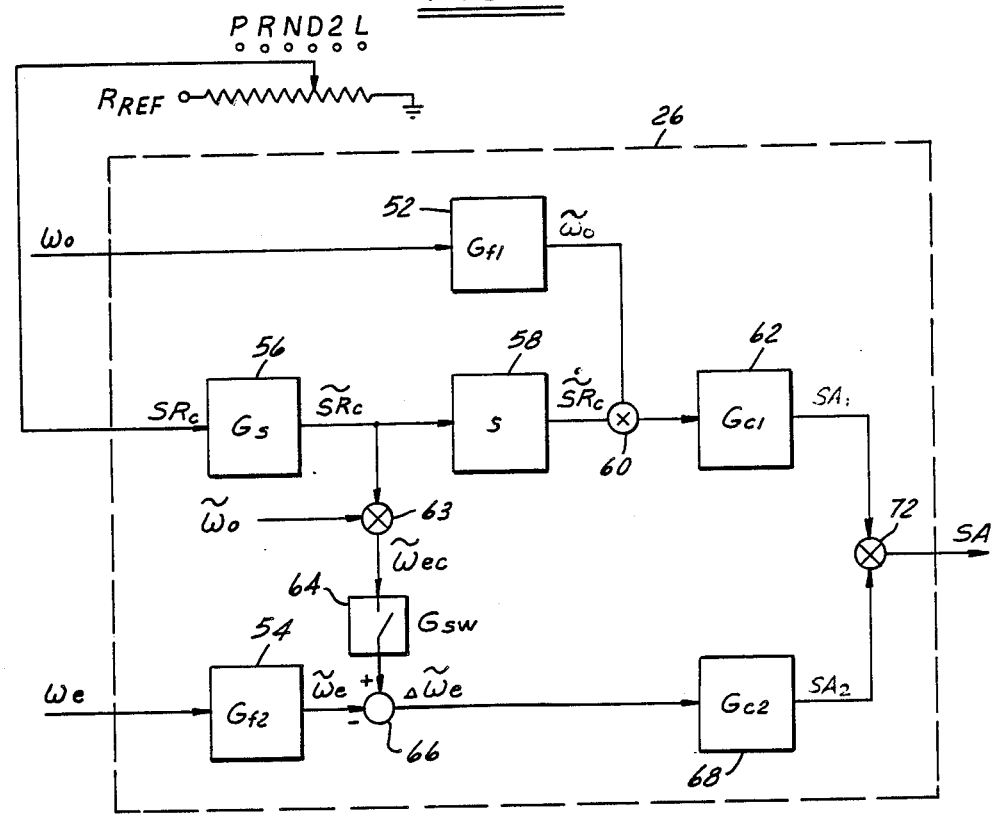
FIG. 4 is a functional block diagram of a spark advance/retard control system filter.

Referring now to FIG. 4, there is shown a simplified functional block diagram of the spark advance controller 26 that produces the SA signal according to the present invention. At the left-side of the diagram are the unfiltered transmission output speed, $\omega_o$, and unfiltered engine speed, $\omega_e$, inputs to the controller, and at the right side of the diagram is the SA output from the controller. The transmission output speed signal is applied to an output speed filter 52, which may be a first-order, low pass 0-1 Hz filter. In the following description, all filters are referred to as being first or second-order. However higher order filters can be used instead where they are appropriate and compatible with the particular hardware used. The unfiltered engine speed, $\omega_e$, is applied as input to an engine speed filter 54, which may be a first order, low pass 0-10 Hz filter. The low pass filters 52, 54 correspond to continuous systems represented by the transfer function of the form $$G(s) = \frac{1}{T_L s + 1}$$

where s is the LaPlace transform operator and $T_L$ is the time constant of the filter. The commanded speed ratio, $SR_c$, which is determined automatically or is taken from a switching device associated with the gear selector lever manually operated by the vehicle operator, is applied as input to a shaping filter 56. Filter 56 is a second order, low pass filter whose transfer function is of the form $$G(s) = \frac{1}{\left(\frac{s}{\omega_n}\right)^2 + 2\zeta\left(\frac{s}{\omega_n}\right) + 1}$$

wherein $\omega_n$ is the undamped natural frequency and $\zeta$ is the damping ratio.

The filtered commanded speed ratio, $\widetilde{SR}_c$, is applied as input to a differentiator 58. The output of the differentiator and the filtered transmission output speed, $\omega_o$, are multiplied at junction point 60 and the product is applied as input to the $G_{C1}$ controller 62, whose output is $$SA_1 = K_1 I_e \bar{\omega}_o \frac{d(\widetilde{SR}_c)}{dt}$$

wherein $K_1$ is integral gain.

The filtered commanded speed ratio, $\widetilde{SR}_c$, and the filtered transmission output speed, $\bar{\omega}_o$, are multiplied at junction point 63 and produce the filtered commanded engine speed, $\bar{\omega}_{ec}$, from the relationship $$\bar{\omega}_{ec} = \widetilde{SR}_c * \bar{\omega}_o$$

This output is applied as input to controller 64 whose transfer function is zero for state feedback and is equal to unity for error feedback. When the system is operating with error feedback, the output of controller 64 is combined with the filtered engine speed at junction point 66 where the signals are subtracted and the error, $\Delta\bar{\omega}_e$, the difference between the filtered commanded engine speed and the filtered engine speed, is produced. This error signal is supplied as input to the proportional-derivative controller 68.

The output of controller 68 is:

$$SA_2 = K_2 (\bar{\omega}_{ec} - \bar{\omega}_e) + K_3 \frac{d}{dt} (\bar{\omega}_{ec} - \bar{\omega}_e)$$

The constants which appear in the outputs of controller 62 and 68, specifically $K_1$, $K_2$ and $K_3$, are suitable positive constants and for example, may have the values 0.50, 0.10 and 0, respectively. The output of controllers 62 and 68 are added at junction point 72 to produce the spark advance output, SA, whose value is $$SA = SA_1 + SA_2$$

When the value of the SA signal is negative, the engine spark is retarded with respect to a standard reference spark, such as the maximum brake torque (MBT) position; otherwise, the engine spark is advanced with respect to the reference, but not above the MBT advance. Alternatively, the SA signal can be used to alter the throttle angle for drive by wire operations or fuel-air ratio when electronic fuel injection is used. For example, when SA is negative, the fuel-air mixture is decreased or made leaner to reduce the engine torque.

Figure 5:
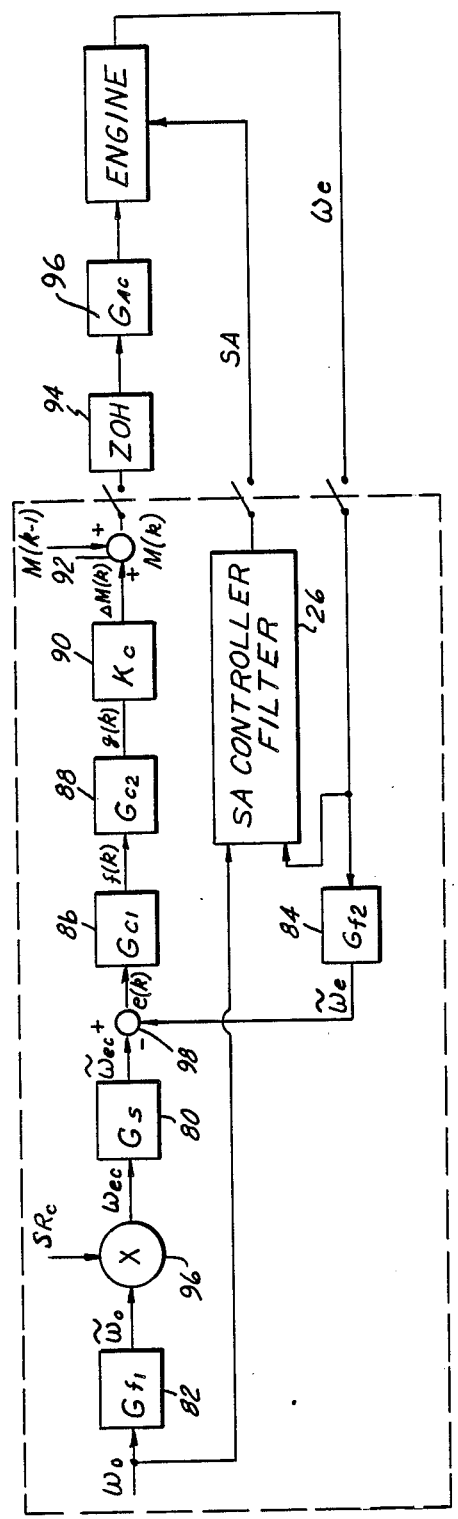
FIG. 5 is a functional block diagram of a clutch control system in which the spark advance/retard control system filter comprises an inner loop.

The spark advance controller/filter 26, shown in FIG. 4, is included as a portion of an inner feedback loop in the control system shown in FIG. 5, which controls the operation of clutch 32 and the engine spark timing. In the system of FIG. 5, the algorithms for filters $G_s$, $G_{f1}$ and $G_{f2}$, 80, 82, 84 can be synthesized using the transfer functions for filters 56, 52, 54, respectively. These transfer functions were previously discussed and are set forth above.

However, control systems can be synthesized also on a discrete time basis. In this case, the transfer functions for the first order, low pass filters 52, 54 82, 84 have the following form:

$$G(z) = \frac{C_1 z^2 + C_2 z + C_3}{z^2 + C_4 z + C_5}$$

where z is the z-transform operator and the constants $C_1$–$C_5$ are of the form:

$$C_1 = C_2 = \frac{T}{2\tau_d + T}$$

$$C_3 = C_5 = 0$$

$$C_4 = \frac{T - 2\tau_d}{T + 2\tau_d}$$

where $\tau_d$ has the value $$\tau_d = \frac{T}{2 \tan (\pi f_c T)}$$

T is the sampling period and $f_c$ is the cutoff frequency. But because the steady-state gain is unity, i.e., because $G(z=1)$ is equal to unity $$C_4 = 2C_1 - 1$$

The shaping filter 80 is a second order, low pass filter whose discrete-time transfer function is of the form $$G(z) = \frac{C_1 z^2 + C_2 z + C_3}{z^2 + C_4 z + C_5}$$

wherein the constants can be determined from $$C_1 = \frac{\omega_n^2}{\omega_n^2 + 4\zeta \frac{\omega_n}{T} + \left(\frac{2}{T}\right)^2}$$

$$C_2 = 2C_1$$

$$C_3 = C_1$$

$$C_4 = \frac{2\omega_n^2 - 2\left(\frac{2}{T}\right)^2}{\omega_n^2 + 4\zeta \frac{\omega_n}{T} + \left(\frac{2}{T}\right)^2}$$

$$C_5 = \frac{\omega_n^2 - 4\zeta \frac{\omega_n}{T} + \left(\frac{2}{T}\right)^2}{\omega_n^2 + 4\zeta \frac{\omega_n}{T} + \left(\frac{2}{T}\right)^2}$$

wherein $\omega_n$ is the undamped natural frequency and $\zeta$ is the damping ratio. Because the steady-state gain is unity $$C_5 = 4C_1 - C_4 - 1$$

For all-pass operations, the second-order filter is specified by $$C_1 = 1; C_2 = C_4 = C_5 = 0$$

The proportional-integral-differential filter 86 is realized from the algorithm.

$$f(k) = K_d[e_1(k) - 2e_1(k-1) + e_1(k-2)] + K_p[e_1(k) - e_1(k-1)] + K_i e(k)$$

where
$e_1 = (\bar{\omega}_{ec} - \bar{\omega}_e)$ for error feedback and $e_1 = \bar{\omega}_e$ for state feedback. k is an integer; $K_d$, $K_p$ and $K_i$ are the differential gain, proportional gain, and integral gain, respectively, and have values which depend upon operating characteristics of the mechanical components of the controlled system such as the engine and clutch; f(k) is the output variable of the filter; and e(k) is the input variable of the filter.

The discrete time algorithm for the lead-lag filter 88 is of the form $$g(k) = -a_1 g(k-1) + a_2 f(k) + a_3 f(k-1)$$

where g(k) is the output variable, f(k) is the input variable of filter 88, and the term (k−1) denotes the previous respective sampled values, i.e., those that immediately precede the values currently being calculated.

The gain, $K_C$, 90 is a constant.

At junction point 92 the previous duty cycle M(k−1) is added to the change in duty cycle ΔM(k) and M(k) is applied as input to zero order hold 94, whose output is a train of pulses of DC voltage or current applied to the coil of a solenoid. The solenoid opens and closes a source of pressurized hydraulic fluid connected to a clutch in the transmission, such as clutch 32. The fluid pressure engages the clutch through a hydraulic actuator. The gain of the clutch actuator GAC is identified at 96.

The reference engine output speed is applied as input to filter 82. At junction point 96, the commanded speed ratio, $SR_c$, is multiplied by the filtered output speed, $\bar{\omega}_o$, to produce the commanded engine speed, $\omega_{ec}$.

At junction point 98, the filtered engine speed, $\bar{\omega}_e$, produced as output from filter 84, is subtracted from the filtered commanded engine speed, $\bar{\omega}_{ec}$, produced as output from filter 80 to produce the actuating signal e(k), which is applied as input to PID filter 86.

Where the spark advance controller-filter 26 operates on a discrete-time basis, the control algorithm for the proportional derivative controllers 62, 68 is $$\Delta SA = K_1^d I_e \bar{\omega}_o(k)*[\widetilde{SR}_c(k) - 2\widetilde{SR}_c(k-1) + \widetilde{SR}_c(k-2)] + K_2[e(k) - e(k-1)] + K_3^d[e(k) - 2e(k-1) + e(k-2)]$$

wherein:

$$K_1^d = \frac{K_1}{T}$$

$$K_3^d = \frac{K_3}{T}$$

$$e(k) = \Delta \omega_e(k) = \bar{\omega}_{ec}(k) - \bar{\omega}_e(k)$$

The change in spark ignition signal is derived from $$SA(k) = SA(k-1) + \Delta \widetilde{SA}(k)$$

where $\Delta \widetilde{SA} = \Delta SA$ for engine speed-dependent controls and $\Delta \widetilde{SA} = (\Delta SA)\bar{\omega}_e(0)/\bar{\omega}_e(k)$ for engine speed rescaled control.

The SA signal is applied as input to an ignition control module that produces a series of high voltage engine ignition pulses which are distributed in a timed sequence to the spark plug in each of the cylinders of the engine to ignite a combustible mixture of air and fuel present in the engine.

Having described a preferred embodiment of our invention what we claim and desire to secure by the U.S. Letters Patent is:

1. A method for controlling the operation of a powertrain that includes a spark ignition internal combustion engine, a multiple speed ratio transmission, means for commanding the speed ratios at which the transmission operates, a hydraulic clutch and a solenoid-operated valve that engages and disengages the clutch in accordance with a duty cycle applied to the solenoid, comprising:
    producing a signal representing a commanded speed ratio $SR_c$;
    producing signals representing transmission output speed $\omega_o$ and engine speed $\omega_e$;
    producing a commanded engine speed signal $\omega_{ec}$ from the relationship $\omega_{ec} = SR_c*\omega_o$;
    producing an engine speed error signal $\Delta \omega_e$ from the relationship $\Delta \omega_e = \omega_{ec} - \omega_e$;
    producing a duty cycle change signal ΔM(k) from the engine speed error signal;
    producing a current duty cycle signal M(k) by adding the current duty cycle change signal to a previous duty cycle signal M(k−1);
    engaging or disengaging the clutch by applying to the solenoid-operated valve the current duty cycle signal;
    retarding the engine ignition with respect to a nominal engine spark ignition according to the following relationship:

$$SA = K_1[I_e \omega_o d/dt(SR_c)] + K_2(\Delta \omega_e) + K_2 d/dt(\Delta \omega_e)$$

wherein d/dt is the differential with respect to time, $I_e$ is the rotational inertia of the engine about the axis of the engine shaft, and $K_1$, $K_2$ and $K_3$ are gain constants.

2. The method of claim 1 further comprising:
    passing the engine speed error signal through a PID filter to produce an output variable signal f(k); and
    passing said output variable signal through a lead-lag filter to produce the duty cycle change signal ΔM(k).

3. A method for controlling torsional vibrations in a powertrain that includes a spark ignition internal combustion engine, a multiple speed ratio transmission, means for commanding the speed ratios at which the transmission operates and a clutch driveably connecting the engine and the transmission comprising:
    producing a signal representing a commanded speed ratio $SR_c$;
    producing a signal representing transmission output speed $\omega_o$;
    differentiating the commanded speed ratio with respect to time;
    retarding the engine ignition with respect to a nominal engine spark ignition according to the following relationship:

$$SA_1 = K_1[I_e \omega_o(d/dt)(SR_c)]$$

wherein $I_e$ is the rotational inertia of the engine about the axis of the engine shaft and $K_1$ is gain.

4. The method of claim 3 further comprising:
    producing a signal representing engine speed $\omega_e$;
    calculating the commanded engine speed $\omega_{ec}$ from the relationship $\omega_{ec} = SR_c*\omega_o$;
    calculating an engine speed error $\Delta \omega_e$ from the relationship $\Delta \omega_e = \omega_{ec} - \omega_e$;
    retarding the engine ignition with respect to a nominal engine spark ignition according to the following relationship $$SA = SA_1 + K_2(\Delta \omega_e) + K_3(d/dt)(\Delta \omega_e)$$

wherein d/dt is the differential with respect to time and $K_2$ and $K_3$ are gain constants.

* * * * *